United States Patent
Champion

(10) Patent No.: US 8,224,406 B2
(45) Date of Patent: Jul. 17, 2012

(54) DUAL-USE PORTABLE DISPLAY DEVICE

(76) Inventor: Geoffrey Champion, South Plainfield, NJ (US)

( * ) Notice: Subject to any disclaimer, the term of this patent is extended or adjusted under 35 U.S.C. 154(b) by 0 days.

(21) Appl. No.: 12/972,605

(22) Filed: Dec. 20, 2010

(65) Prior Publication Data

US 2011/0188191 A1    Aug. 4, 2011

Related U.S. Application Data

(63) Continuation-in-part of application No. 11/998,628, filed on Dec. 1, 2007, now abandoned.

(51) Int. Cl.
*H04M 1/00*    (2006.01)

(52) U.S. Cl. ........... 455/575.3; 455/90.3; 455/550.1; 455/575.1; 361/679.27; 361/679.28; 361/679.16; 361/679.09; 361/679.15

(58) Field of Classification Search ........... 455/550.1, 455/575.1, 575.3, 90.3; 361/679.27, 679.28, 361/679.16, 679.09, 679.15
See application file for complete search history.

(56) References Cited

U.S. PATENT DOCUMENTS

| | | | |
|---|---|---|---|
| 5,278,779 A | | 1/1994 | Conway et al. |
| 5,644,338 A | | 7/1997 | Bowen |
| 6,047,196 A | | 4/2000 | Makela et al. |
| 6,510,325 B1 | * | 1/2003 | Mack et al. ............... 455/575.2 |
| 6,542,354 B1 | | 4/2003 | Holtorf et al. |
| 6,894,626 B2 | * | 5/2005 | Olodort et al. ............... 341/22 |
| 6,983,175 B2 | | 1/2006 | Kwon |
| 6,989,984 B2 | * | 1/2006 | Sutton et al. ............. 361/679.16 |
| 7,054,146 B2 | * | 5/2006 | Sutton et al. ............. 361/679.28 |
| 7,107,018 B2 | | 9/2006 | Jellicoe |
| 7,130,669 B2 | | 10/2006 | Moon |
| 7,333,321 B2 | * | 2/2008 | Sutton et al. ............. 361/679.09 |
| 7,336,979 B2 | | 2/2008 | Soejima |
| 7,864,524 B2 | * | 1/2011 | Ladouceur et al. ...... 361/679.55 |
| 2002/0072395 A1 | | 6/2002 | Miramontes |
| 2004/0203513 A1 | | 10/2004 | Kwon |
| 2005/0017953 A1 | * | 1/2005 | Pekka ........................... 345/169 |
| 2005/0026658 A1 | | 2/2005 | Soejima |
| 2005/0164752 A1 | * | 7/2005 | Lau et al. ................... 455/575.3 |

OTHER PUBLICATIONS

Yanko Design, iWEB 2.0 Laptop Concept fold-out-laptop, Mar. 30, 2010, original date of sale unknown.

* cited by examiner

*Primary Examiner* — April G Gonzales
(74) *Attorney, Agent, or Firm* — Gearhart Law, LLC

(57) ABSTRACT

A portable display device that, in a first configuration, may function as a first type of device, such as a cellular phone and, in a second configuration, as a second type of device, such as a personal computer a split, full size keyboard spanning a display panel. Each keyboard panel may be substantially equal in size to the display panel, and may constitute the left and right hand halves of a standard keyboard. The keyboard panels may be hingably connected to the opposite short sides of the rectangular display panel. The device may further include a numeric keypad, hingably connected to a short edge of either keyboard panel.

14 Claims, 8 Drawing Sheets

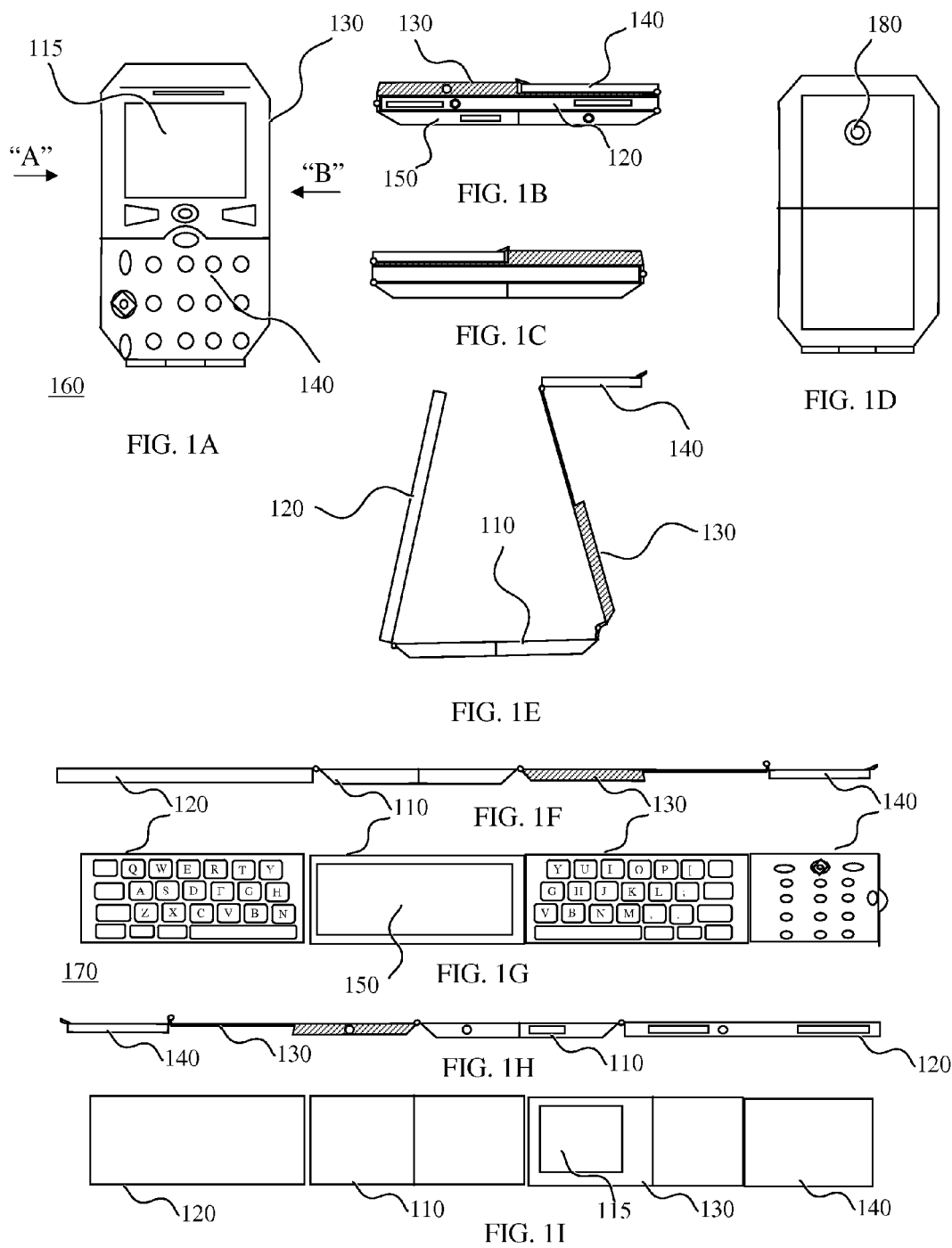

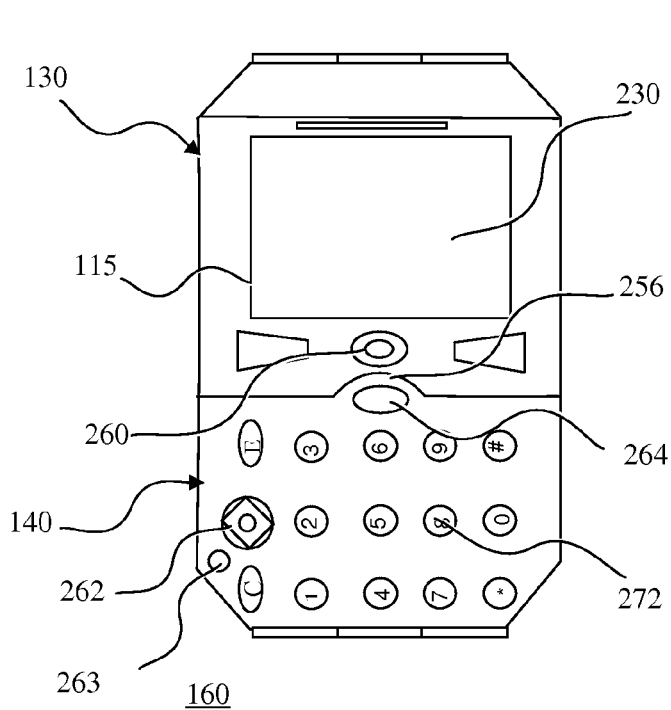
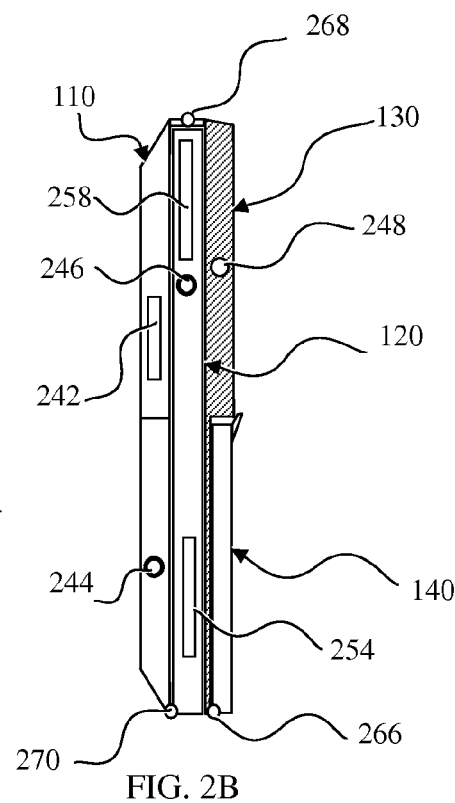
FIG. 2A                FIG. 2B
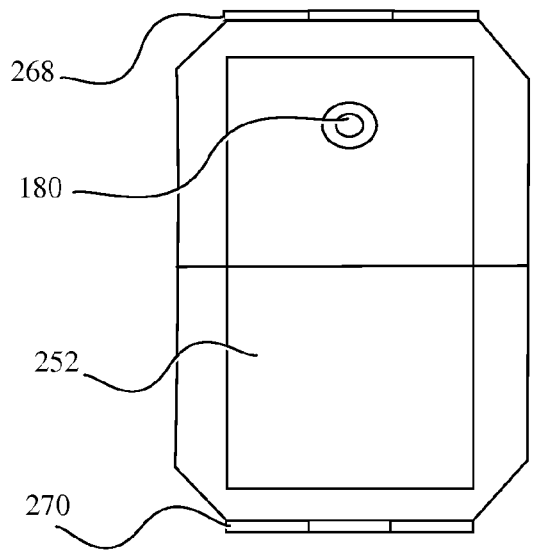
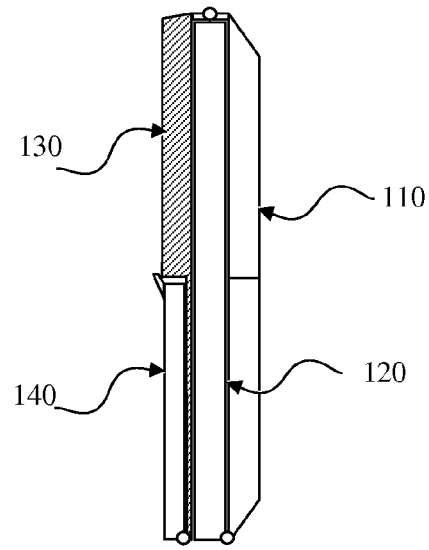
FIG. 2C                FIG. 2D

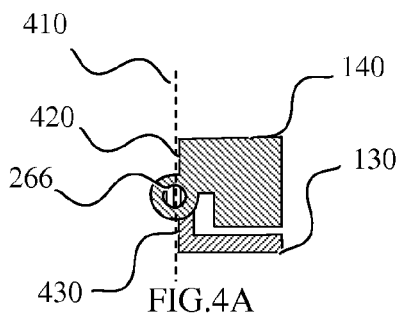 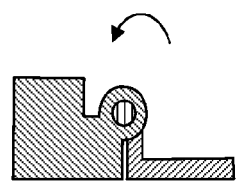 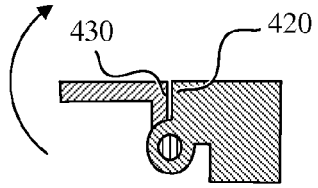
FIG.4A    FIG.4B    FIG.4C
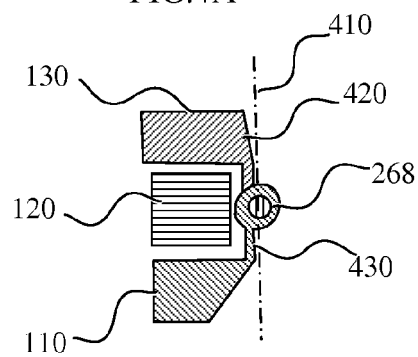 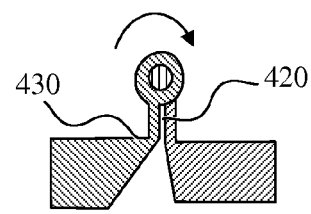
FIG.4D    FIG.4E
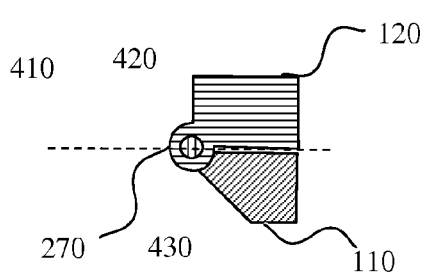 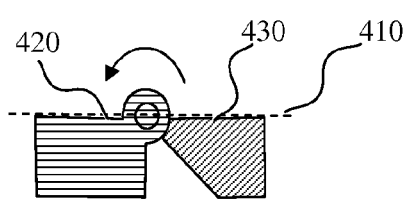
FIG.4F    FIG.4G

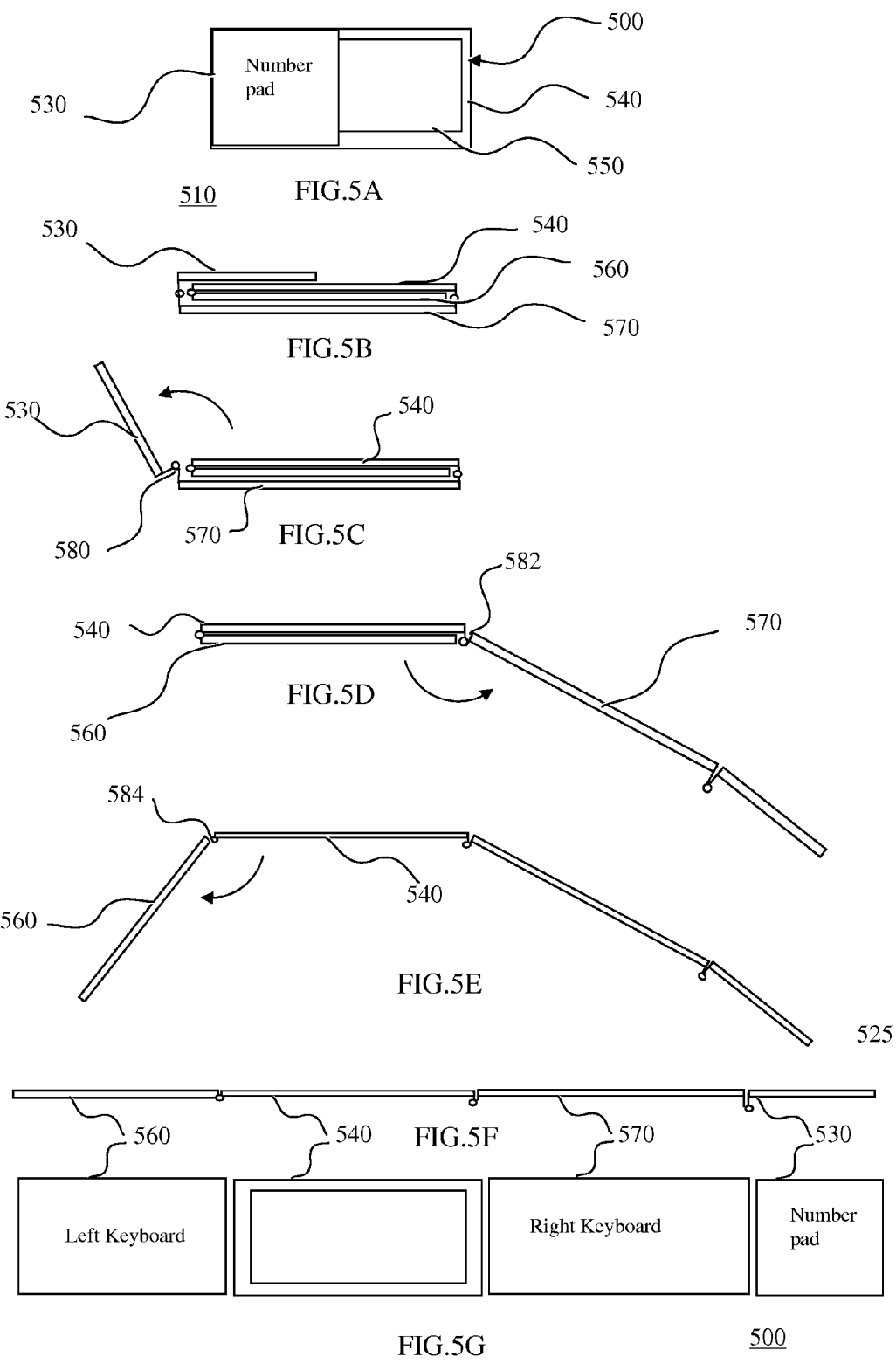

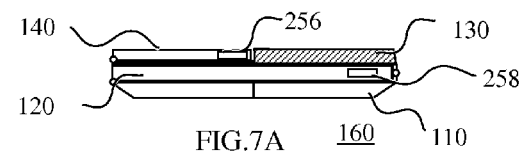
FIG.7A
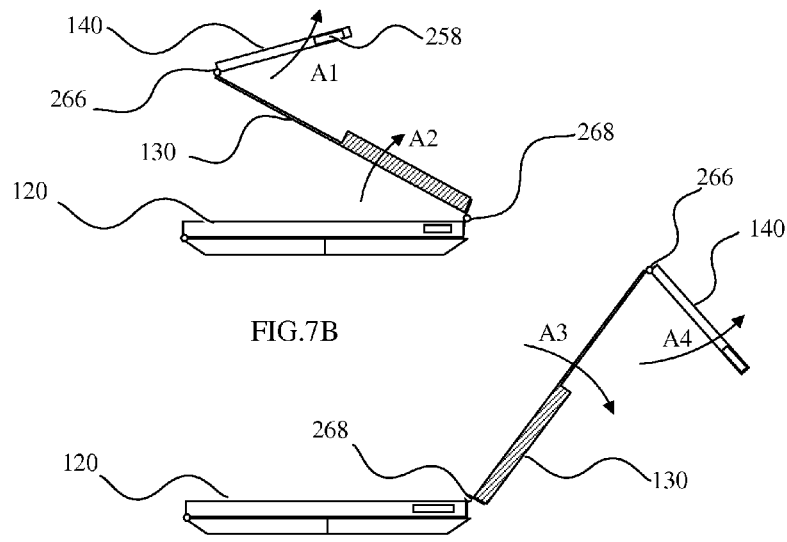
FIG.7B
FIG.7C
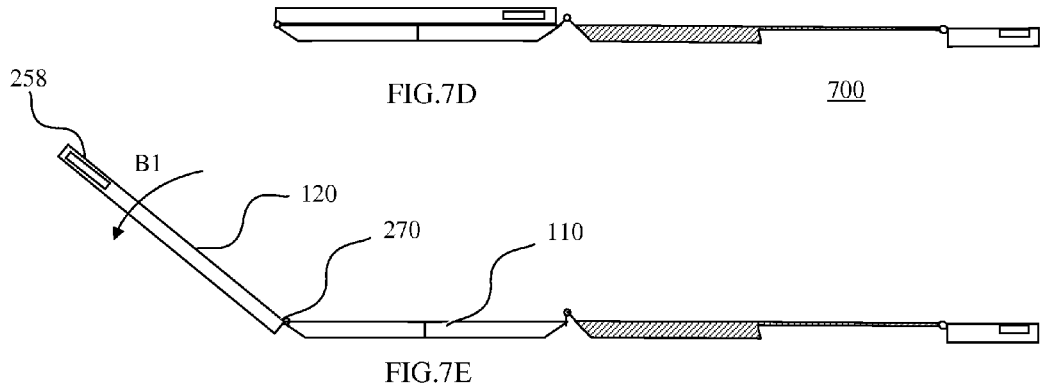
FIG.7D
FIG.7E
FIG.7F

DUAL-USE PORTABLE DISPLAY DEVICE

CLAIM OF PRIORITY

This application claims priority to, and is a continuation in part, of U.S. patent application Ser. No. 11/998,628 filed on Dec. 1, 2007, the contents of which are fully incorporated herein by reference.

FIELD OF THE INVENTION

The invention relates to portable electronics devices, and more particularly to portable devices capable of physical transformation between at least two configurations, each configuration providing the full functionality of a distinct electronic device.

BACKGROUND OF THE INVENTION

Many electronic devices have common components, making dual use devices potentially a way of saving costs. Differing physical requirements, however, often make obtaining these potential savings impractical. For instance, cellular phones and personal computers (PCs) both have display screens, programmable general purpose processors and memory for storage. It would seem desirable to have an electronic device that could function both as a cellular phone and a PC by using a common display screen, a common processor and a common memory, thereby saving on hardware costs. The problem is keyboard input of text. In a PC, text input is typically facilitated by a full size key board, i.e., one the size of a typewriter keyboard, with individual keys that are sufficiently large, and spaced apart, that an average adult, skilled in the art of typing, may touch type on such a keyboard using all ten of their distal phalanges, i.e., all their fingers and thumbs.

DESCRIPTION OF THE RELATED ART

The relevant prior art involving dual configuration electronic devices includes:

U.S. Pat. No. 6,989,984 issued to Sutton, et al. on Jan. 24, 2006 entitled "Personal entertainment device (PED) with double-opening flap" that describes an electronic device having three substantially planar panels. The first panel has a first side edge and a second side edge, and includes a display. The second panel includes a first interface and is hingedly coupled to the first side edge of the first panel. The third panel includes a second interface and is hingedly coupled to the second side edge of the first panel. The device is configured in at least two positions. In a first position the first interface and the second interface are obscured and in a second position the first interface and the second interface are exposed. Such a device can be a gamer with a first gaming interface and a second gaming interface, or it can be an electronic device with PDA technology through a first keyboard and a second keyboard. Alternatively, the device can be a communicator or a music player.

U.S. Pat. No. 6,510,325 issued to Mack, II, et al. on Jan. 21, 2003 entitled "Convertible portable telephone" that describes a communications and entertainment device in which a cellular telephone is unfolded to form a headset which allows the user to wear the headset in a manner similar to conventional telephone headsets. The device includes an AM/FM radio receiver. The subsystems are prioritized such that one system is automatically interrupted based on higher priority activity. A display unit allows the user to display graphic information such as facsimile data or other graphic information such as that obtained from computer networks. A speaker phone function allows the user to hear audio output while the user has the device folded into the portable telephone configuration and hand-held. An integrated camera allows the device to be used for video phone telephone calls. An integral GPS receiver is built into the device to allow the location of the device to be automatically determined. The GPS receiver can be used in conjunction with the video phone function if the device is stolen by capturing a picture of the thief while the thief is dialing the stolen telephone and relaying that information along with GPS position information to local police such that the thief may be more easily captured and the device recovered.

US Patent Publication no. 2005/0017953 by Pekka published on Jan. 27, 2005 entitled "Mobile terminal device having foldable functional cover" that describes a new way to implement bigger keyboard in basic mobile terminal devices without increasing the size. The mobile terminal device is foldable, and can be arranged in two different closed positions. A mobile terminal device according to the invention comprises a housing, at least two covers pivotably attached to said housing, and at least two different operative surfaces. The two covers are movable between at least two closed positions. The at least two different operative surfaces are arranged on different surfaces of one of the housing and/or the covers in a way that in at least one of the closed positions, one of the two different operative surfaces is located on an outer surface of the mobile terminal device in the closed position. So that a user can chose which user interface is presented to him by closing the mobile terminal device in one way or the other.

Various implements are known in the art, but fail to address all of the problems solved by the invention described herein. One embodiment of this invention is illustrated in the accompanying drawings and will be described in more detail herein below.

SUMMARY OF THE INVENTION

The present invention relates to a portable display device that, in a first configuration, may function as a first type of compact display device, and, in a second configuration, as a second type of display device.

In a preferred embodiment, the portable display device may be a compact cellular phone in a first configuration and, in a second configuration, may effectively function as a personal computer and include a split, full size keyboard input, and functional user access to a display panel in its entirety.

The portable display device may, for instance, include a substantially rectangular display panel housing that may house a first display panel. There may be a first keyboard housing panel that may be substantially equal in size to the display panel housing. The first keyboard housing panel may, for instance, house keys that constitute a left hand half of a standard keyboard. The first keyboard housing panel may be hingably connected to a first short side of the substantially rectangular display panel housing.

The portable display device may also include a second keyboard housing panel that may also be substantially equal in size to the display panel housing. The second keyboard housing panel may, for instance, house keys that constitute a right hand half of a standard keyboard and may be hingably connected to a second short side of the display panel housing.

The portable display device may further include a numeric keypad housing panel that may be hingably connected to a short edge of either keyboard housing panel.

In a further preferred embodiment, the portable display device may further include functional user access to the numeric keypad housing panel in either configuration.

The display panel may, for instance, be a color or black and white liquid crystal display, or a color light emitting diode (LED) display, or some combination thereof. In a preferred embodiment, the display panel incorporates a substantially transparent touch sensitive cover layer.

Therefore, the present invention succeeds in conferring the following, and others not mentioned, desirable and useful benefits and objectives.

It is an object of the present invention to provide a wireless communications device may be very easily transformed between two, functional configurations.

It is another object of the present invention to provide an easily transformable wireless communications device that in one function configuration may be optimized for portability while in another functional configuration may be optimized for user input.

It is another object of the present invention to provide a comfortable easy to use fully functional cell phone that may be transformed to a fully functionally personal computer.

It is another object of the present invention to provide a cellular phone with a display, controls and an easy to use numeric keypad.

Yet another object of the present invention is to provide a personal computer controlled by a divided alpha keyboard with a touchpad display located in the middle and a numeric keypad on one side.

Still another object of the present invention is to allow the numeric keyboard to be optionally located on either the left or the right hand side of the unit when it is open.

Still another object of the present invention is to provide keys that are of a size, spacing and arrangement to allow for touch typing.

Yet another object of the present invention is to optionally provide a QWERTY or internal arrangement for the alpha keys.

Still another object of the present invention is to provide an optional numeric layout that may be the same as a calculator or a phone.

Still another object of the present invention is to locate all interconnections and ports on one side of the device so as not to interfere with a person using the device in either configuration.

Still another object of the present invention is to optionally provide a digital camera.

BRIEF DESCRIPTION OF THE DRAWINGS

FIG. 1A shows a front view of a preferred embodiment of the present invention in a first, folded configuration.

FIG. 1B shows a side view, looking along "A", of a preferred embodiment of the present invention in a first, folded configuration.

FIG. 1C shows a side view, looking along "B", of a preferred embodiment of the present invention in a first, folded configuration.

FIG. 1D shows a rear view of a preferred embodiment of the present invention in a first, folded configuration.

FIG. 1E shows a side view, looking along "B", of a preferred embodiment of the present invention in a transitional configuration.

FIG. 1F shows a side view, looking along "B", of a preferred embodiment of the present invention in a second, opened configuration.

FIG. 1G shows a front view of a preferred embodiment of the present invention in a second, opened configuration.

FIG. 1H shows a side view, looking along "A", of a preferred embodiment of the present invention in a second, opened configuration.

FIG. 1I shows a rear view of a preferred embodiment of the present invention in a second, opened configuration.

FIG. 2A shows a detailed front view of a preferred embodiment of the present invention in a first, folded configuration.

FIG. 2B shows a detailed side view, looking along "C", of a preferred embodiment of the present invention in a first, folded configuration.

FIG. 2C shows a detailed rear view of a preferred embodiment of the present invention in a first, folded configuration.

FIG. 2D shows a detailed side view, looking along "D", of a preferred embodiment of the present invention in a first, folded configuration.

FIG. 4A shows a x-sectional view of a hinge used to connect the numeric keypad housing panel and the second keyboard housing panel in a preferred embodiment of the present invention, in a closed configuration.

FIG. 4B shows a x-sectional view of a hinge used to connect the numeric keypad housing panel and the second keyboard housing panel in a preferred embodiment of the present invention, in an open configuration.

FIG. 4C shows a x-sectional view of a hinge used to connect the numeric keypad housing panel and the second keyboard housing panel in a preferred embodiment of the present invention, in an open configuration, after the second keyboard housing panel has itself been rotated about second hinge.

FIG. 4D shows a x-sectional view of a hinge used to connect the second keyboard housing panel and the substantially rectangular display panel housing in a preferred embodiment of the present invention, in a closed configuration.

FIG. 4E shows a x-sectional view of a hinge used to connect the second keyboard housing panel and the substantially rectangular display panel housing in a preferred embodiment of the present invention, in an open configuration.

FIG. 4F shows a x-sectional view of a hinge used to connect the first keyboard housing panel and the substantially rectangular display panel housing in a preferred embodiment of the present invention, in a closed configuration.

FIG. 4G shows a x-sectional view of a hinge used to connect the first keyboard housing panel and the substantially rectangular display panel housing in a preferred embodiment of the present invention, in an open configuration.

FIG. 5A shows a front view of a further embodiment of the present invention in a first, folded configuration.

FIG. 5B shows a side view of a further embodiment of the present invention in a first, folded configuration.

FIG. 5C shows a side view of a further embodiment of the present invention in a transitional configuration after a first step in unfolding.

FIG. 5D shows a side view of a further embodiment of the present invention in a transitional configuration after a second step in unfolding.

FIG. 5E shows a side view of a further embodiment of the present invention in a transitional configuration after a third step in unfolding.

FIG. 5F shows a side view of a further embodiment of the present invention in a second unfolded configuration.

FIG. 5G shows a front view of a further embodiment of the present invention in a second unfolded configuration.

FIG. 7A shows a side view of an embodiment of the present invention in a first, folded configuration.

FIG. 7B shows a side view of an embodiment of the present invention in a transitional configuration at an early stage during a first half of the unfolding process.

FIG. 7C shows a side view of an embodiment of the present invention in a transitional configuration at a later stage during a first half of the unfolding process.

FIG. 7D shows a side view of an embodiment of the present invention in a transitional configuration after a first half of the unfolding process has been completed.

FIG. 7E shows a side view of an embodiment of the present invention in a transitional configuration during a second half of the unfolding process.

FIG. 7G shows a side view of an embodiment of the present invention in a second, unfolded configuration.

DESCRIPTION OF THE PREFERRED EMBODIMENTS

Figure 3A:
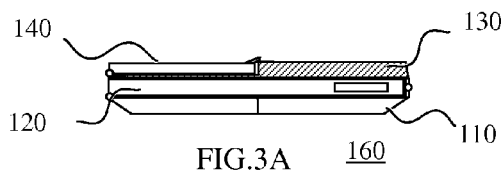
FIG. 3A shows a side view of an embodiment of the present invention in a first, folded configuration.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1A shows a front view of a preferred embodiment of the present invention in a first, folded configuration. The portable display device 100 is shown having substantially rectangular display panel housing 110 containing a display panel 115 and a numeric keypad housing panel 140.

FIG. 1B shows a side view, looking along "A", of a preferred embodiment of the present invention in a first, folded configuration. The portable display device 100 is shown having a substantially rectangular display panel housing 110, a first keyboard housing panel 120, a second keyboard housing panel 130 and a numeric keypad housing panel 140. The first keyboard housing panel 120 may, for instance, house keys representing a right hand half of a standard keyboard. The second keyboard housing panel 130 may, for instance, house keys representing a left hand half of standard keyboard.

FIG. 1C shows a side view, looking along "B", of a preferred embodiment of the present invention in a first, folded configuration. Essentially the same elements are visible in FIG. 1C as in 1B, through viewed from a different side.

FIG. 1D shows a rear view of a preferred embodiment of the present invention in a first, folded configuration. In this view, the rear of the substantially rectangular display panel housing 110 is shown, including an optional digital camera lens 180.

FIG. 1E shows a side view, looking along "B", of a preferred embodiment of the present invention in a transitional configuration. The numeric keypad housing panel 140 has been rotated away from the second keyboard housing panel 130. The second keyboard housing panel 130 has itself been rotated away from the substantially rectangular display panel housing 110 allowing the first keyboard housing panel 120 to also be rotated away from the substantially rectangular display panel housing 110.

FIG. 1F shows a side view, looking along "B", of a preferred embodiment of the preferred embodiment in the same opened configuration. In both these views, the first keyboard housing panel 120, that may, for instance, be a left hand half of a standard QWERTY keyboard, is shown connected to the substantially rectangular display panel housing 110 by a hinge located on one of the short sides of the substantially rectangular display panel housing 110. Similarly, the second keyboard housing panel 130, that may, for instance, be the right hand half of a standard QWERTY keyboard, is shown connected by a hinge to the other short side of the substantially rectangular display panel housing 110. The numeric keypad housing panel 140 is shown connected to a short side of the second keyboard housing panel 130. Also shown in FIG. 1G is a second display panel 150. In this configuration, the portable display device 100 may function as a second type of display device that includes a split, full size keyboard for input, while allowing functional user access to the second display panel 150 in its entirety.

In comparing FIGS. 1A and 1G, one of ordinary skill in the art will readily appreciate that the arrangement of joining the elements shown in FIG. 1 of the portable display device 100 may allow functional user access to the numeric keypad housing panel in either configuration. That is, numeric keypad housing panel access may be possible both in the first, folded configuration 160, when the portable display device 100 may, for instance, function as a cellular telephone, and in the second, unfolded configuration 170, when the portable display device 100 may function as a personal computing device having a full size, split keyboard. Such a keyboard may allow a user skilled in the art of typing to input information by means of touch typing.

FIG. 1H shows a side view, looking along "A", of a preferred embodiment of the present invention in a second, opened configuration, while FIG. 1I shows a rear view of a preferred embodiment in the same opened configuration. These views show essentially the same elements as in FIGS. 1F and 1G, but now seen from the rear.

FIG. 2A shows a detailed front view of a preferred embodiment of the present invention in a first, folded configuration.

In a first, folded configuration 160, the portable display device 100 may, for instance, function as a wireless communication device such as, but not limited to, a cellular phone, a satellite phone, or a walkie-talkie. This may be accomplished by, for instance, folding portable display device 100 so that a user has access to a numeric keypad housing panel 140 and a second keyboard housing panel 130 that may have a display panel 115 on a rear side.

In a preferred embodiment, the numeric keypad housing panel 140 may include at least one function button 272. Each individual function button 272 may, for instance, be labeled with its input function that may be, but is not limited to, a numeric value. By means of the function button 272 a user may, for instance, enter data into the portable display device 100 such as, but not limited to, telephone numbers. This may be done in order to use the portable display device 100 as a cellular telephone. The display panel 115 may, for instance, be used to display status or information such as, but not limited to, the status of a cellular connection, the status of a conversation, the name or number of a person being called or calling or some combination thereof.

The display panel 115 may, for instance, be any well known display technology such as, but not limited to, a liquid crystal display, a color light emitting diode (LED) display, an e-ink display or some combination thereof. The display panel 115 may also include transparent touch sensitive cover layer 230.

The portable display device 100 in the first, folded configuration 160 may allow the user functional access to other, possibly optional elements such as, but not limited to, a camera control 260, a loud speaker 264, a pointer control 262 or some combination thereof. The camera control 260 may, for instance, be used to take digital pictures or video via the digital camera lens 180. The microphone 263 may, for instance, be used to speak into when the portable display device 100 is functioning as a cellular phone, while the loud speaker 264 may be used to listen in such a configuration.

As shown in FIG. 2A, the display panel 115 may incorporate a substantially transparent touch sensitive cover layer 230 so that the portable display device 100 in the first, folded configuration 160 may have the functionality of a touch screen.

FIG. 2B shows a detailed side view, looking along "C", of a preferred embodiment of the present invention in a first, folded configuration. The first keyboard housing panel 120 may be sandwiched between the substantially rectangular display panel housing 110 and the second keyboard housing panel 130, while the numeric keypad housing panel 140 may be folded back onto a suitable recess in the second keyboard housing panel 130. The view also shows the first hinge 266 that may connect the numeric keypad housing panel 140 to the second keyboard housing panel 130, as well as the second hinge 268 that may connect the second keyboard housing panel 130 to the substantially rectangular display panel housing 110, and the third hinge 270 that may connect the substantially rectangular display panel housing 110 to the first keyboard housing panel 120.

FIG. 2B also shows optional connection components 240 that may be a part of the portable display device 100. The optional connection components 240 may, for instance, be include items such as, but not limited to, a USB port 242 and a power plug 244, shown here as part of the substantially rectangular display panel housing 110; an earphone and microphone plug 246, a secondary tab 258 and a memory card slot 254, shown here as part of the first keyboard housing panel 120; and a infra-red port 248, shown here as part of the second keyboard housing panel 130.

The earphone and microphone plug 246 may, for instance, be used to attach an earphone and microphone for use while making a telephone call. The infra-red port 248 may be used to transfer data and the USB port 242 may, for instance, be used for functions such as, but not limited to, exchanging information with, or charging or receiving charge from, a peripheral device such as, but not limited to, a printer, a personal computer, a network or some combination thereof. The power plug 244 may, for instance, allow connection to a power plug to change an internal battery in the portable display device 100. The memory card slot 254 may, for instance, accommodate an SD storage or other card slot to, for instance, add memory to the portable display device 100, or to exchange data such as, but not limited to, pictures, contacts, appointments, documents, presentations or some combination thereof.

The view of FIG. 2B also shows the hinges connecting the main elements of the portable display device 100 together. The numeric keypad housing panel 140 is shown connected by a first hinge 266 to the second keyboard housing panel 130 along a short side of both elements. The second keyboard housing panel 130 is in turn shown connected by a second hinge 268 to the substantially rectangular display panel housing 110 along short sides of both elements.

The substantially rectangular display panel housing 110 is also show connected by a third hinge 270 to the first keyboard housing panel 120 along a short side of both elements.

FIG. 2C shows a detailed rear view of a preferred embodiment of the present invention in a first, folded configuration. In this view the back of the substantially rectangular display panel housing 110 is shown. This may, for instance, include a digital camera lens 180 and a battery cover 252. The digital camera lens 180 may, for instance, be used to take digital still or video pictures. The battery cover 252 may, for instance, be slidably removable to enable access to the portable display device's 100 internal battery.

The view of FIG. 2C also shows the second hinge 268 that may be used to connect the substantially rectangular display panel housing 110 by one of its short sides to the second keyboard housing panel 130. The view also shows the third hinge 270 that may be used to connect the substantially rectangular display panel housing 110 via its other short side to the first keyboard housing panel 120.

FIG. 2D shows a detailed side view, looking along "D", of a preferred embodiment of the present invention in a first, folded configuration. This view shows the first keyboard housing panel 120 sandwiched between the substantially rectangular display panel housing 110 and the second keyboard housing panel 130, with the numeric keypad housing panel 140 folded into a suitable recess in the second keyboard housing panel 130.

In a preferred embodiment, there may be connection components 240 on this side of the portable display device 100. This is so that in the unfolded configuration, all the connections to the device may be on a side away from a user and therefore not interfere with the user's access to the device.

FIG. 3A shows a side view of an embodiment of the present invention in a first, folded configuration 160. The portable display device 100 is shown lying flat, with the first keyboard housing panel 120 sandwiched between the second keyboard housing panel 130 and the substantially rectangular display panel housing 110, with the numeric keypad housing panel 140 folded flat into a recess in the second keyboard housing panel 130. In the first, folded configuration 160 the numeric keypad housing panel 140 may be oriented to be accessible by the user. Because the portable display device 100 is seen looking along "B" (FIG. 1A), in a preferred embodiment, there are no connection components 240 shown in this view.

Figure 3B:
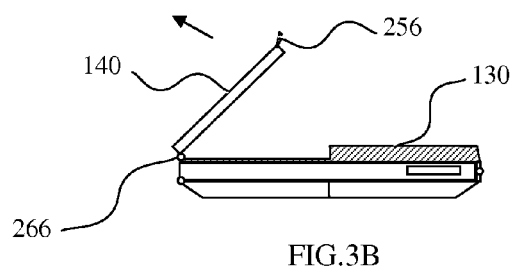
FIG. 3B shows a side view of an embodiment of the present invention in a transitional configuration after a first step in unfolding.

FIG. 3B shows a side view of an embodiment of the present invention in a transitional configuration after a first step in unfolding. In this first step of transitioning from a first, folded configuration 160 to a second, unfolded configuration 170, the numeric keypad housing panel 140 may be rotated about a first hinge 266, away from the non-functional surface of the second keyboard housing panel 130. The primary tab 256 may be used to facilitate this first transition step.

Figure 3C:
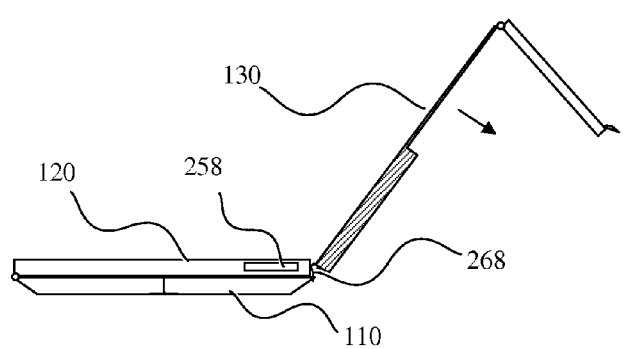
FIG. 3C shows a side view of an embodiment of the present invention in a transitional configuration after a second step in unfolding.

FIG. 3C shows a side view of an embodiment of the present invention in a transitional configuration after a second step in unfolding. In this second step, the second keyboard housing panel 130 may be rotated about the second hinge 268 that connects the second keyboard housing panel 130 to the substantially rectangular display panel housing 110 and away from the non-functional surface of the first keyboard housing panel 120. The secondary tab 258 is now exposed, and may be used to make the next transition.

Figure 3D:
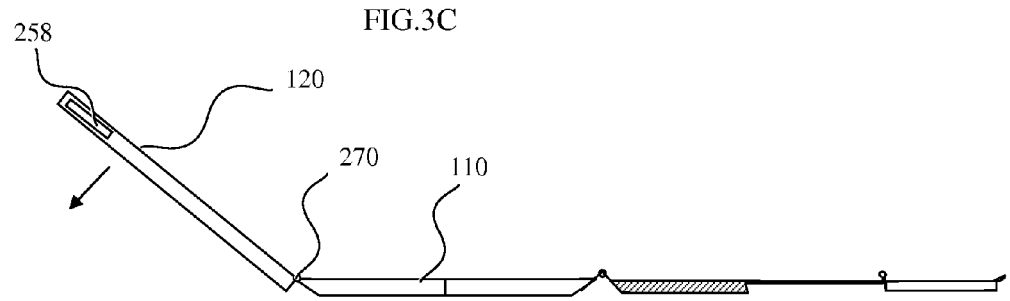
FIG. 3D shows a side view of an embodiment of the present invention in a transitional configuration after a third step in unfolding.

FIG. 3D shows a side view of an embodiment of the present invention in a transitional configuration after a third step in unfolding. In this third step, the first keyboard housing panel 120 may be accessed via the secondary tab 258 and be rotated about the third hinge 270 away from the surface of the substantially rectangular display panel housing 110 containing the second display panel 150.

Figure 3E:
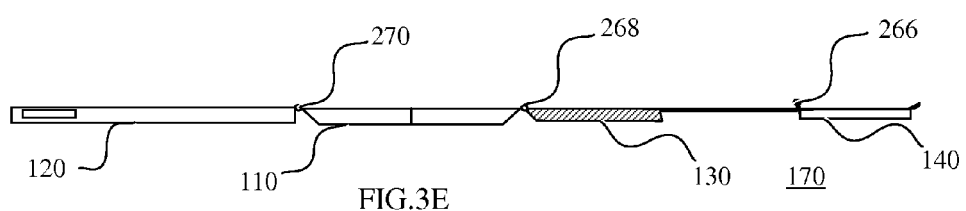
FIG. 3E shows a side view of an embodiment of the present invention in a second unfolded configuration.

FIG. 3E shows a side view of an embodiment of the present invention in a second unfolded configuration. The rotations of the $1^{st}$, $2^{nd}$, and $3^{rd}$ steps described above have been carried through to an extent that the portable display device 100 may now be in a second, unfolded configuration 170.

One of ordinary skill in the art will readily appreciate that although the unfolding of the device has been described in discrete steps, that the transition, or conversion, may be thought of as occurring in two easy steps, one using the primary tab 256 to unfold one half of the device and the other using the secondary tab 258 to unfold the other half of the device.

FIG. 4A shows a x-sectional view of a first hinge 266 used to connect the numeric keypad housing panel 140 and the second keyboard housing panel 130 in a preferred embodiment of the present invention, in a closed configuration.

FIG. 4B shows a x-sectional view of the first hinge 266 hinge used to connect the numeric keypad housing panel and the second keyboard housing panel in a preferred embodiment of the present invention, in an open configuration. The numeric keypad housing panel 140 has been rotated anti-clockwise around the first hinge 266, away from the none functional side of the second keyboard housing panel 130, as described above as step 1 of transitioning from first, folded configuration 160 to second, unfolded configuration 170. Both the numeric keypad housing panel 140 and the second keyboard housing panel 130 both now have their none-functional surfaces facing upward.

FIG. 4C shows a x-sectional view of a hinge used to connect the numeric keypad housing panel and the second keyboard housing panel in a preferred embodiment of the present invention, in an open configuration, after the second keyboard housing panel has itself been rotated about second hinge. This additional rotation around second hinge 268 may result in the numeric keypad housing panel 140 and the second keyboard housing panel 130 arriving at the second, unfolded configuration 170 with both having there functional surfaces facing up.

FIG. 4D shows a x-sectional view of a second hinge 268 used to connect the second keyboard housing panel 130 and the substantially rectangular display panel 110 housing in a preferred embodiment of the present invention, in a closed configuration. The second hinge 268 has to be shaped to allow the first keyboard housing panel 120 to be sandwiched between the second keyboard housing panel 130 and the substantially rectangular display panel housing 110 when the portable display device 100 is in a first, folded configuration 160.

FIG. 4E shows a x-sectional view of second hinge 268 used to connect the second keyboard housing panel and the substantially rectangular display panel housing in a preferred embodiment of the present invention, in an open configuration. The second keyboard housing panel 130 may have been rotated in a clockwise direction about the second hinge 268 so that in the second, unfolded configuration 170 both the second keyboard housing panel 130 and the substantially rectangular display panel housing 110 have their functional surfaces facing upward.

FIG. 4F shows a x-sectional view of a third hinge 270 used to connect the first keyboard housing panel 120 and the substantially rectangular display panel housing 110 in a preferred embodiment of the present invention, in a closed configuration.

FIG. 4G shows a x-sectional view of third hinge 270 used to connect the first keyboard housing panel 120 and the substantially rectangular display panel housing 110 in a preferred embodiment of the present invention, in an open configuration. The first keyboard housing panel 120 may have been rotated in an anti-clockwise direction about the third hinge 270 so that in a second, unfolded configuration 170 both the first keyboard housing panel 120 and the substantially rectangular display panel housing 110 have their functional surfaces facing upward.

Figure 4H:
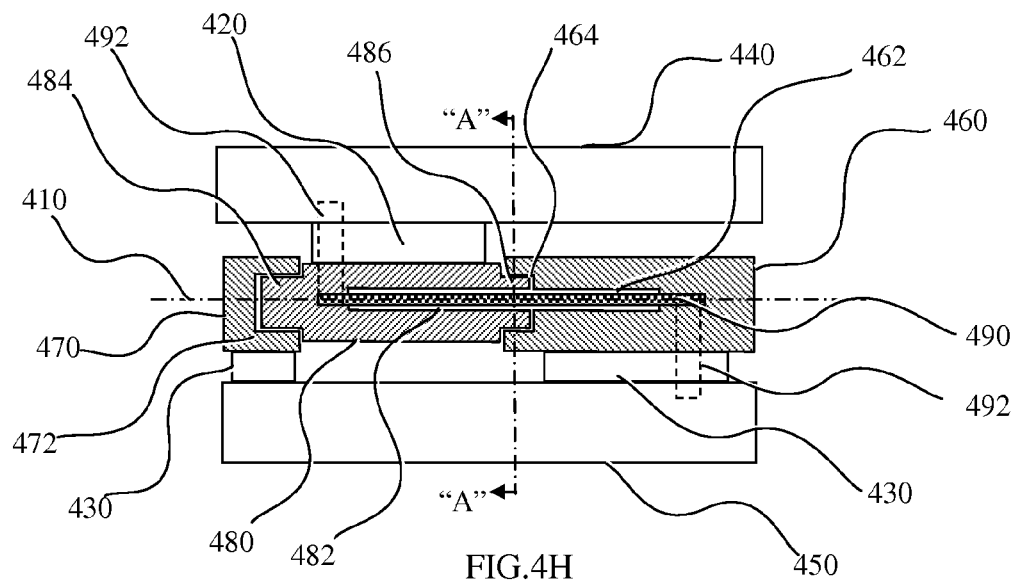
FIG. 4H shows a x-sectional view taken on "AA" of a hinge having a cable feed through used in a preferred embodiment of the present invention, in a closed configuration.

FIG. 4H shows a x-sectional view taken on "AA" of a hinge having a cable feed-through used in a preferred embodiment of the present invention, in a closed configuration.

A first panel 440 may be connected to an inner hinge-portion 480 by a first confronting surface 420 of the hinge. The inner hinge-portion 480 may be constrained to allow only rotation about a center of rotation 410 of the hinge by a first part of an outer hinge-portion 460 and a second part of an outer hinge-portion 470. This constraint may be effected by, for instance, a left smaller diameter extension 484 of the inner hinge-portion 480 that may be rotationally nested within a cylindrical bore 472 of the second part of an outer hinge-portion 470, and a right smaller diameter extension 486 of the inner hinge-portion 480 that may be rotationally nested within a second cylindrical bore 464 of the first part of an outer hinge-portion 460. The first part of an outer hinge-portion 460, and the second part of an outer hinge-portion 470, may be attached to a second panel 450 by a second confronting surface 430 of the hinge.

The inner hinge-portion 480 may have a cylindrical bore 482 that may extend the entire length of the inner hinge-portion 480 or may only extent part of the way along the length of the inner hinge-portion 480.

The first part of an outer hinge-portion 460 may have a first cylindrical bore 462 that may have a diameter substantially the same size as the cylindrical bore 482 of the inner hinge-portion 480 and be positioned adjacent to each other such that a wiring cable 490 may be threaded through them both.

The wiring cable 490 may be connected at each end to a cable-to-panel connector 492. The one cable-to-panel connector 492 may connect the first panel 440 to the wiring cable 490, while the other cable-to-panel connector 492 may connect the second panel 450 to the wiring cable 490. In this way, an electrical connection may be established between the first panel 440 and the second panel 450. As the hinge is opened or closed the cable may be twisted by 180 degrees. The cable may be a single strand of wire, or it may be a number of wires that may be covered with insulation and may be wound together like a cable.

Figure 4I:
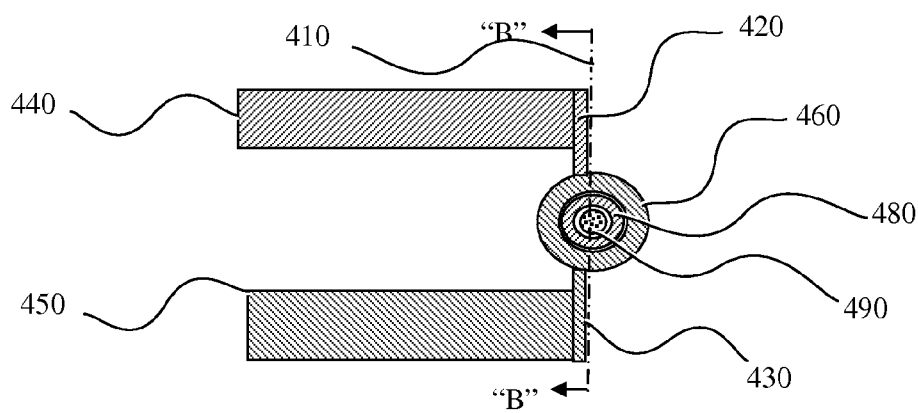
FIG. 4I shows a x-sectional view taken on "BB" of a hinge having a cable feed through used in a preferred embodiment of the present invention, in a closed configuration.

FIG. 4I shows a x-sectional view taken on "BB" of a hinge having a cable feed through used in a preferred embodiment of the present invention, in a closed configuration.

The wiring cable 490 may be enclosed in the inner hinge-portion 480 that is in turn enclosed in the first part of an outer hinge-portion 460. As shown, the first confronting surface 420 of the hinge and the second confronting surface 430 of the hinge may both be close to or substantially at the center of rotation 410 of the hinge.

Figure 4J:
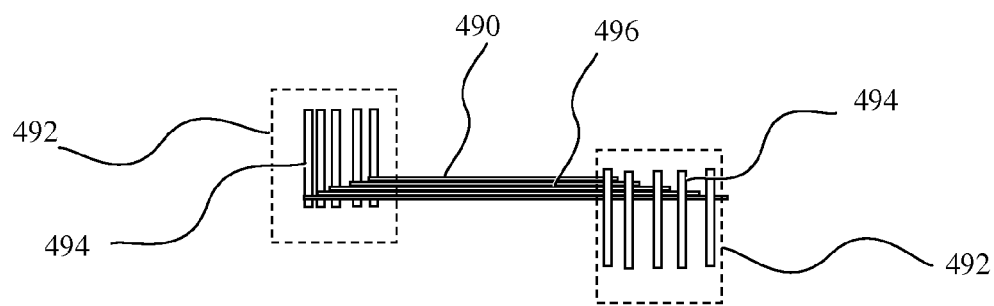
FIG. 4J shows a schematic view a cable feed through used in a preferred embodiment of the present invention, in a closed configuration.

FIG. 4J shows a schematic view a cable feed through used in a preferred embodiment of the present invention, in a closed configuration.

The cable-to-panel connectors 492 may be made up of a number of individual wire connectors 494. The wiring cable 490 may be made up of a number of individual strands of wire 496. Each of the individual wire connectors 494 may connect with one of the individual strands of wire 496. This may, for instance be done by having each of the individual strands of wire 496 be a different length, and each having insulation removed from their ends so that contact may be made from one individual wire connector 494 to another individual wire connector 494 via the individual strand of wire 496.

One of ordinary skill in the art will readily appreciate that the hinges described above exhibit a number of advantages such as, but not limited to, allowing for different thickness panels, allowing for wiring, are compact and they allow the unit to lay flat when in an open configuration.

The hinges described above may be made of any suitable material such as, but not limited to, plastic, metal, aluminum, wood or some combination thereof.

FIG. 5A shows a front view of a further embodiment of the present invention in a first, folded configuration 510. A front view of the transformable tablet device 500 is shown. In a preferred embodiment, the front of the transformable tablet device 500 may include a main panel 540 housing a touch screen display screen 550. In the first, folded configuration 510, the number pad 530 may have a functional surface facing the user and may obscure a portion of the touch screen display screen 550.

FIG. 5B shows a side view of a further embodiment of the present invention in a first, folded configuration. The number pad 530 may, as shown, have a functional surface facing outward, with a non-functional surface resting on the functional surface of the main panel 540. The left half-alpha keyboard 560 may be sandwiched between the main panel 540 and the right half-alpha keyboard 570.

As shown in FIG. 5B, the number pad 530 may be connected by a first, two panel wide hinge 580 to a short side of the right half-alpha keyboard 570. The right half-alpha keyboard 570 may be substantially equal in area to the main panel 540, and may be connected to a short side of the main panel 540 by a second, one panel wide hinge 582. The main panel 540 may be connected by its other short side to a short side of the left half-alpha keyboard 560 that may be substantially equal in area to the main panel 540.

FIG. 5C shows a side view of a further embodiment of the present invention in a transitional configuration after a first step in unfolding. The number pad 530 may been rotated around a first, two panel wide hinge 580 in an anti-clockwise motion, so that the non-function surface of the first, two panel wide hinge 580 moves away from the functional surface of the main panel 540.

FIG. 5D shows a side view of a further embodiment of the present invention in a transitional configuration after a second step in unfolding. In this step the right half-alpha keyboard 570 may have been rotated around a second, one panel wide hinge 582 in an anti-clockwise direction so that a non-functional surface of the right half-alpha keyboard 570 is moved away from a functional surface of the left half-alpha keyboard 560.

FIG. 5E shows a side view of a further embodiment of the present invention in a transitional configuration after a third step in unfolding. The left half-alpha keyboard 560 may be rotated around a third, flush hinge 584 in a clockwise direction so that a non-functional surface of the left half-alpha keyboard 560 moves away from a non-function surface of the main panel 540.

FIG. 5F shows a side view of a further embodiment of the present invention in a second unfolded configuration 520. Although the method of attaching, folding and unfolding described above to transition from a first, folded configuration 510 that may, for instance, function as a tablet device to a second, unfolded configuration 520 that may, for instance, function as a personal computer with a full size, split key board, display panel a number pad, one of ordinary skill in the art will readily appreciate that the hinges face downward, while the functional surfaces of the transformable tablet device 500 face upward. One possible solution to this problem may be to have small pads of appropriate height and width on the non-functional surfaces in the vicinity of the hinges.

FIG. 5G shows a front view of a further embodiment of the present invention in a second unfolded configuration. In this view the touch screen display screen 550 of the main panel 540 may be seen situated between the left half-alpha keyboard 560 and the right half-alpha keyboard 570 and connected to both of them via the short sides of the main panel 540.

One of ordinary skill in the art will readily appreciate that although the number pad 530 is shown connected to the right half-alpha keyboard 570, a mirror arrangement may be devised for left handed users in which the number pad 530 may be attached to the left half-alpha keyboard 560.

Figure 6A:
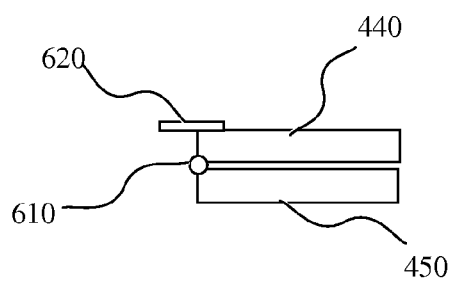
FIG. 6A shows a side view of a portion of a further embodiment of the present invention having a locking flange, in a closed position.

FIG. 6A shows a side view of a portion of a further embodiment of the present invention having a locking flange, in a closed position.

The first panel 440 may be joined to the second panel 450 by a locking flange 620. The locking flange 620 may be an flat extension on the underside of the first panel 440.

Figure 6B:
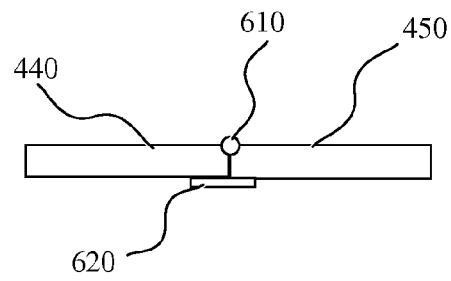
FIG. 6B shows a side view of a portion of a further embodiment of the present invention having a locking flange, in an open position.

FIG. 6B shows a side view of a portion of a further embodiment of the present invention having a locking flange, in an open position.

The first panel 440 has rotated around the hinge 610 until the locking flange 620 abuts the underside of the second panel 450. The first panel 440 may now be prevented from rotating further. The two panels may, therefore, be held by gravity in a ridged, flat configuration even without support under both of the panels.

FIG. 7A shows a side view of an embodiment of the present invention in a first, folded configuration 160. The portable display device 100 may have a substantially rectangular display panel housing 110, a first keyboard housing panel 120, a second keyboard housing panel 130 and a numeric keypad housing panel 140. The numeric keypad housing panel 140 may have a primary tab 256 and the first keyboard housing panel 120 may have a secondary tab 258. Both the primary tab 256 and the secondary tab 258 may be designed to so that the respective panels may be easily gripped by a user's finger and thumb for ease of transforming the device from the first, folded configuration 160 to the second, unfolded configuration 170. The tabs may, for instance, be grippable items such as, but not limited to, a protrusion, and indentation, a textured structure or some combination thereof.

FIG. 7B shows a side view of an embodiment of the present invention in a transitional configuration at an early stage during a first half of the unfolding process.

A user may, for instance, have gripped the numeric keypad housing panel 140 by the primary tab 256. In lifting the numeric keypad housing panel 140, both the numeric keypad housing panel 140 and the second keyboard housing panel 130 may move in a scissor like fashion with numeric keypad housing panel 140 rotating away from second keyboard housing panel 130 about the first hinge 266 in a motion A1, while the second keyboard housing panel 130 may rotate away from the first keyboard housing panel 120 around the second hinge 268 in a motion A2.

FIG. 7C shows a side view of an embodiment of the present invention in a transitional configuration at a later stage during a first half of the unfolding process.

The user may continue to grip the numeric keypad housing panel 140 by means of the primary tab 256 so that both second keyboard housing panel 130 and numeric keypad housing panel 140 continue to unfold with second keyboard housing panel 130 rotating away from the first keyboard housing panel 120 by rotating around the second hinge 268 in motion A3, while the numeric keypad housing panel 140 moves away from the second keyboard housing panel 130 by rotating around the first hinge 266 in motion A4.

FIG. 7D shows a side view of an embodiment of the present invention in a transitional, half-open configuration 700 after a first half of the unfolding process has been completed. In the half-open configuration 700, the second keyboard housing panel 130 and the numeric keypad housing panel 140 are now fully extended in a flat orientation, and may be ready for use.

FIG. 7E shows a side view of an embodiment of the present invention in a transitional configuration during a second half of the unfolding process.

The user may have lifted first keyboard housing panel 120 by the gripping secondary tab 258 and moving the first keyboard housing panel 120 away from substantially rectangular display panel housing 110 by rotating around the third hinge 270 in motion B1.

FIG. 7F shows a side view of an embodiment of the present invention in a second, unfolded configuration 170. In the second, unfolded configuration 170 all components of the portable display device 100 are now unfolded and oriented in a flat configuration, and may be ready for use.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A portable display device, comprising: a substantially rectangular display panel housing, housing a first display panel and having a first short side and a second short side, and wherein said first display panel covers an area of 80% or more of said display panel housing:
   a first keyboard housing panel, substantially equal in size to said substantially rectangular display housing and less than 25% larger than said first display panel, and being hingably connected to said first short side of said substantially rectangular display panel housing;
   a second keyboard housing panel, substantially equal in size to said substantially rectangular display panel housing and hingable connected to said second short side of said substantially rectangular display panel housing, and said second keyboard housing having a substantially constant, rectangular cross-section, such that in a first configuration, said portable display device functions as a first type of compact display device and in a second configuration said portable display device functions as a second type of display device comprising a split, full size keyboard input, and functional user access to said display panel in its entirety, and wherein in said first configuration, said substantially rectangular in cross-section, second keyboard is sandwiched between said display panel housing and said first keyboard housing and said substantially rectangular in cross-section, second keyboard separates all parts of said display panel housing from said first keyboard housing by at least the thickness of said substantially rectangular in cross-section second keyboard.

2. The device of claim 1 further comprising a numeric keypad housing panel hingably connected to a short side of either said first keyboard housing panel or said second keyboard housing panel.

3. The device of claim 2 further comprising functional user access to said numeric keypad housing panel in either said first configuration or said second configuration.

4. The device of claim 1 wherein said display panel is a liquid crystal display.

5. The device of claim 1 wherein said display panel is a color light emitting diode (LED) display and further comprises a substantially transparent touch sensitive cover layer.

6. The device of claim 2 wherein said second keyboard housing panel further comprises a second display panel disposed such that in said first configuration, said portable display device comprises functional user access to said second display panel.

7. The device of claim 3 wherein said first configuration further comprises functional user access to at least a portion of said first display panel.

8. The device of claim 3 further comprising at least one connection component.

9. The device of claim 8 wherein said connection component is selected from the group comprising a USB port, a power plug, an earphone and microphone plug or some combination thereof.

10. The device of claim 3 further comprising one of a digital camera lens a battery cover, a memory card slot, a primary tab, a secondary tab, a camera control, a pointer control a loud speaker or some combination thereof.

11. The device of claim 3 further comprising at least one locking flange situated so as to limit rotation of one of said panels to another of said panels to substantially 180 degrees.

12. The device of claim 3 wherein at least one of said hingable connections comprises a hinge having a cable feedthrough.

13. The device of claim 3 wherein at least one of said hingable connections comprises a hinge having both confronting surfaces of the hinge substantially at the center of rotation of the hinge.

14. A method of transforming a portable display device from a first, folded configuration to a second, unfolded configuration, said method comprising the steps of:
   providing portable display device having:
     a substantially rectangular display panel housing, housing a first display panel and having a first short side and a second short side, and wherein said first display panel covers an area of 80% or more of said display panel housing;
     a first keyboard housing panel, substantially equal in size to said substantially rectangular display panel housing and hingably connected to said first short side of said substantially rectangular display panel housing;

a second keyboard housing panel, substantially equal in size to said substantially rectangular display panel housing and less than 25% larger than said first display panel, and said second keyboard housing having a substantially constant, rectangular cross-section and being hingably connected to said second short side of said substantially rectangular display panel housing; and wherein in said first configuration, said substantially rectangular in cross-section second keyboard is sandwiched between said display panel housing and said first keyboard housing and said substantially rectangular in cross-section second keyboard separates all parts of said display panel housing from said first keyboard housing by at least the thickness of said substantially rectangular in cross-section second keyboard rotating a numeric keypad housing panel about a first hinge such that said numeric keypad housing panel moves away from said second keyboard housing panel comprising a right hand section of a keyboard;

rotating said second keyboard housing panel around a second hinge such that said second keyboard housing panel moves away from said substantially rectangular display panel housing; and rotating said first keyboard housing panel comprising a left hand section of a keyboard around a third hinge such that said first keyboard housing panel moves away from said substantially rectangular display panel housing.

\* \* \* \* \*